C. C. BROWN.
CANDY CUTTING DEVICE.
APPLICATION FILED JUNE 25, 1913.
1,092,331.
Patented Apr. 7, 1914.
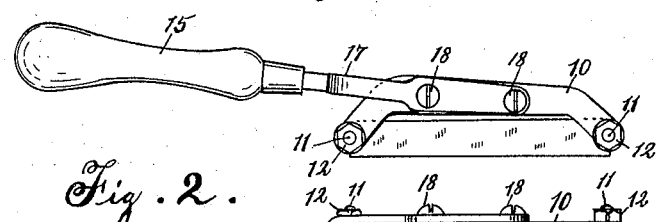
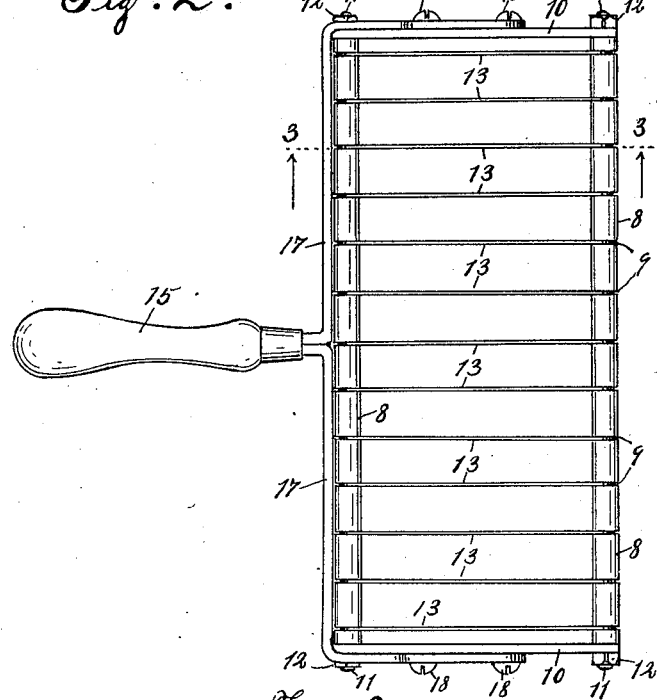
WITNESESS:
INVENTOR
Clarence C. Brown
By
Alex H. Lidders
ATTORNEY.

UNITED STATES PATENT OFFICE.

CLARENCE C. BROWN, OF LOS ANGELES, CALIFORNIA.

CANDY-CUTTING DEVICE.

1,092,331.   Specification of Letters Patent.   Patented Apr. 7, 1914.

Application filed June 25, 1913. Serial No. 775,972.

*To all whom it may concern:*

Be it known that I, CLARENCE C. BROWN, a citizen of the United States of America, residing at Los Angeles, county of Los Angeles, State of California, have invented a certain new and useful Candy-Cutting Device; and I do hereby declare the following to be a full, clear, and exact description of the invention, such as will enable others skilled in the art to which it appertains to make and use the same.

This invention relates to candy cutting device, and it may be said to consist in the provision of the novel and advantageous features and in the novel and improved construction, arrangement, and combination of parts as will be apparent from the description and claims which follow hereinafter.

Objects of the invention are to provide a novel and improved candy cutting device which is simple in construction, strong and durable, easy to operate, effective in action, enables quick work being done by the user, handy and economical to use, designed to permit the parts being rapidly assembled; and in which the cutting blades are adapted to be quickly mounted, or dismounted for cleaning or replacing the same.

Other objects and the advantages of the invention will be apparent to those skilled in the art from a consideration of the following description of the preferred form of construction embodying it, taken in connection with the accompanying drawings in which—

Figure 1 is an end elevational view of the device; Fig. 2 is a plan view of the device; Fig. 3 is an enlarged sectional view taken on the line 3—3 of Fig. 2; Fig. 4 shows various views of one of the cutting blades; Fig. 5 is a fragmentary view of one of the rods; and Figs. 6 and 7 show the device being used.

The frame of the device consists of spaced rods 8, preferably round, which are formed with a plurality of spaced grooves 9 therein, and which are suitably connected together by preferably arched end bars 10. As shown, the end portions of the end bars 10 may be fitted on the threaded reduced end portions 11 of the rods 8, and they may be secured in position by nuts 12. On the frame are mounted a plurality of spaced vertical spring metal cutters 13. The latter are preferably formed with substantially semi-circular recesses 14 in the end portions thereof, whereby they may be quickly detachably mounted on the frame by springing the cutters to dispose freely the recessed end portions thereof in the spaced grooves 9 of the rods 8. To detach the cutters 13 from the rods 8 it is merely necessary to press them laterally to spring them out of the grooves 9. A suitable handle 15 is connected with the arched end bars 10, and it is preferably disposed in a raised position to admit of clearance for the operator's hand between it and the work table 16. The handle 15 is preferably affixed to a bracket 17 which may be secured to the end bars 10 by means of screws 18.

The device is particularly designed for use for cutting the "fondant" for the centers of chocolate creams. In use it is pressed down on a roll of the fondant and it is then raised by the handle 15 which may be given a quick jerking movement which causes the divided portions of the fondant adhering between the cutters 13 to be dislodged and fall where desired on the work table or surface adjacent to the latter.

The device has the merit of being simple in construction and well adapted to carry out the objects of the invention.

While one form of construction embodying the invention has been particularly illustrated and described, many changes and modifications thereof that will readily occur to those skilled in the art—wherefore the right is reserved to all changes and modifications which do not depart from the spirit and scope of the invention as defined in the appended claims.

I claim:

1. A candy cutting device, comprising spaced rods formed with spaced grooves therein, end bars connecting the rods, substantially vertical spring metal cutting blades having the end portions thereof sprung freely into the grooves, and a handle on the device adapted to permit manipulation of the device as set forth.

2. A candy cutting device, comprising spaced rods formed with spaced grooves therein, arched end bars connecting the rods, substantially vertical spring metal cutting blades having semi-circular recesses in the ends thereof whereby they may be quickly detachably mounted on the rods by springing the blades to have the end portions of the blades disposed freely in said grooves, a bracket on the end bars, and a handle on the bracket for manipulating the device in use as set forth.

In testimony whereof, I have signed my name to this specification in the presence of two subscribing witnesses at Los Angeles, county of Los Angeles, State of California, this 19th day of June, A. D. 1913.

CLARENCE C. BROWN.

Witnesses:
B. F. ROEHRIG,
A. H. LIDDERS.

Copies of this patent may be obtained for five cents each, by addressing the "Commissioner of Patents, Washington, D. C."